(12) United States Patent
Stigler et al.

(10) Patent No.: US 7,134,315 B1
(45) Date of Patent: Nov. 14, 2006

(54) PULSE RADAR LEVEL SENSING GAUGE

(75) Inventors: Joseph E. Stigler, Cincinnati; Neil T. Wilkie, Hamilton, both of OH (US)

(73) Assignee: Ohmart/Vega Corporation, Cincinnati, OH (US)

( * ) Notice: Subject to any disclaimer, the term of this patent is extended or adjusted under 35 U.S.C. 154(b) by 0 days.

(21) Appl. No.: 09/178,836

(22) Filed: Oct. 26, 1998

(51) Int. Cl.
*G01F 23/00* (2006.01)

(52) U.S. Cl. .................................. 73/0.29 V; 73/290 R
(58) Field of Classification Search ............... 73/290 V, 73/290 R
See application file for complete search history.

(56) References Cited

U.S. PATENT DOCUMENTS

| | | | |
|---|---|---|---|
| 3,775,832 A | 12/1973 | Werra | 29/450 |
| 4,020,690 A * | 5/1977 | Samuels et al. | 73/299 |
| 4,064,052 A | 12/1977 | Zimmerly | 210/433 |
| 4,283,989 A * | 8/1981 | Toulios et al. | 73/167 |
| 4,351,114 A * | 9/1982 | Sigget et al. | 73/105 |
| 4,531,532 A | 7/1985 | Zimmerly | 137/15 |
| 4,568,115 A | 2/1986 | Zimmerly | 285/411 |
| 4,570,665 A | 2/1986 | Zimmerly | 137/240 |
| 4,594,891 A | 6/1986 | Benz et al. | 73/290 |
| 4,596,839 A | 6/1986 | Peters | 523/175 |
| 4,872,712 A | 10/1989 | Maier | 285/341 |
| 4,948,096 A | 8/1990 | Alderman | 251/357 |
| 4,984,449 A * | 1/1991 | Caldwell et al. | 73/49.2 |
| 5,011,196 A | 4/1991 | Sabatier et al. | 285/367 |
| 5,115,655 A | 5/1992 | Martin et al. | 72/68 |
| 5,230,149 A | 7/1993 | Martin | 29/888.072 |
| 5,380,015 A | 1/1995 | Laflin et al. | 277/37 |
| 5,507,181 A * | 4/1996 | Fox et al. | 73/290 V |
| 5,551,707 A | 9/1996 | Pauley et al. | 277/233 |
| 5,703,289 A * | 12/1997 | Mulrooney | 73/290 V |
| 5,737,963 A * | 4/1998 | Eckert et al. | 73/290 V |
| 5,926,080 A * | 7/1999 | Palan et al. | 73/290 R |
| 5,936,237 A * | 8/1999 | Van der Weide | 73/105 |
| 5,975,102 A * | 11/1999 | Schalk | 73/290 |

* cited by examiner

*Primary Examiner*—Hezron Williams
*Assistant Examiner*—Katina Wilson
(74) *Attorney, Agent, or Firm*—Wood, Herron & Evans, L.L.P.

(57) ABSTRACT

An improved pulse radar level sensing gauge for insertion into a storage or processing tank includes a housing; a probe cover comprising a sealing flange; and a probe for sensing electrical and mechanical properties, positioned at least partly below the sealing flange of the probe cover. The unitary flange of the probe cover aids in preventing contamination of the tank contents by foreign substances. Additionally, the location of the probe at least partly below the sealing flange of the probe cover improves the accuracy of the level sensing gauge by reducing disruption of the properties by the tank following the attachment of the level sensing gauge to the tank.

46 Claims, 4 Drawing Sheets

PULSE RADAR LEVEL SENSING GAUGE

FIELD OF THE INVENTION

The present invention relates to pulse radar level sensing gauges for measurement of levels of liquids and solids within storage tanks.

BACKGROUND OF THE INVENTION

In many industrial environments, products are processed and/or stored in tanks prior to their disposition. Examples of such use of storage tanks include the batch processing of foods, beverages, or pharmaceuticals. In these industries, one must be able to reliably determine the amount of contents stored within a tank at any given time. This determination may be made visually or through the use of apparatus that gauges the level of such contents. In many instances, the structural components of the tanks themselves prevent any sort of visual determination of the present level of the contents. For example, many tanks are composed of steel or other nontransparent materials and, therefore, any visual inspection of the content level of such tanks would involve manually opening the tank. Any opening of a tank presents the potential problem of contaminating the contents with microorganisms or other foreign substances. This problem is especially pronounced in tank applications which need to remain sanitary, such as the batch processing of foods and/or pharmaceuticals. Aside from contamination, visual inspection of content levels lacks accuracy and would be time consuming. In order to avoid these problems, level sensing gauges are used to measure content levels in storage and processing tanks.

There are several types of level sensing gauges. Examples include those that use radar transmitters, or ultrasonic waves. Regardless of the gauge's method of operation, there is a need for accuracy in level measurement. A high degree of accuracy has been achieved by the use of level sensing gauges which monitor content levels by transmitting microwave pulses from an antenna toward the surface of the tank contents. These pulses are reflected from the contents and back to the antenna. In most applications a waveguide, which is generally rod-shaped, is used to direct the transmitted pulse to the tank contents and the reflected echo back to the antenna of the level sensing gauge. Other radar gauges use a continuous wave rather than pulses.

Radar sensors are suitable for liquids, solids, powders, granules, dust, corrosive steam and vapors, regardless of the media characteristics, environment, low and high pressures or temperatures.

Radar signals are unaffected by noise, by extreme air turbulence, such as during pneumatic filling, or by fluctuations in dielectric constant above a nominal minimum value, density, or conductivity. Even liquids having highly agitated surfaces or gas bubbles are usually reliably measured. Gas layering such as that produced by solvents or gases has virtually no adverse effect.

Although the use of radar and pulses has served in increase the accuracy of level sensing gauges, they are still susceptible to decreased precision. For instance, a problem concerning interference with radar signals has arisen due to the structure of the level sensing gauges themselves and becomes especially pronounced when the gauges are combined with their operation in a storage tank. In general, a level sensing gauge consists of a housing which encloses the components of the transmitter and the antenna of the gauge. The antenna both transmits and receives microwave pulses of radar, which travel down a waveguide and are subsequently reflected off the contents of the tank and returned to the antenna via the waveguide. Objects in close proximity to the antenna may potentially disrupt the microwave pulses of radar thereby resulting in false echoes and imprecise readings. One such object is the roof and/or body of the storage tank to which the level sensing gauge is attached. The very configuration of the level sensing gauge as attached to the storage tank thus facilitates the disruption of the radar pulses.

In securing a level sensing gauge to a storage tank, a hole is first cut into the body of the tank, generally the roof. Next, a collar will be welded to the tank surrounding this hole. The level sensing gauge is then inserted through the collar and hole into the tank with the antenna and waveguide aligned to reflect microwave pulses off the surface of the contents in the tank. The level sensing gauge is then clamped to the collar of the tank. This configuration of the level sensing gauge attached to the roof of a storage tank results in the antenna being in close proximity to the roof of the storage tank. This location disrupts both the transmittal and reception of microwaves thus decreasing the accuracy of level measurement.

Another problem created by methods of attachment of level sensing gauges to storage tanks is the potential for contamination which was previously discussed. During attachment, the exterior of the housing which constitutes the mounting for the level sensing gauge is generally threaded. The attachment of the housing to the collar of the storage tank involves multiple components. To aid in the sanitary sealing of the gauge to the tank, gaskets are interposed between the various components of the mounting and collar. In this method of attachment there exist several potential locations to entrap microorganisms or other substances foreign to the contents of the tank which cannot readily be cleaned. Therefore, these methods of attachment are not adequate for those applications which require a sanitary seal.

Accordingly, and in view of the above background, there is need for a level sensing gauge which is sanitarily sealable to a storage tank to prevent the ingress of microorganisms and other contaminants to the contents therein. Further, it is desirable that as the level sensing gauge is sanitarily sealed during attachment to a storage tank its antenna is positioned so as to eliminate any interference with the microwave radar pulses by the body of the tank.

SUMMARY OF THE INVENTION

This invention solves the problems associated with known apparatus for measuring levels of contents within a storage tank by the use of radar. The apparatus of this invention also satisfies the aforementioned needs that exist in the art as developed in the background of this invention.

The level sensing gauge of the present invention includes an enclosed housing which forms a chamber for containing the components of the level sensing gauge. A probe cover attaches to the base of this housing. The end of this probe cover proximate to the housing of the level sensing gauge includes a sealing flange which prevents the contamination of the contents of the tank by microorganisms and other foreign substances. A probe is housed within the probe cover and senses electrical and mechanical properties used to determine the surface level of the contents of the tank. In accordance with the principles of the present invention, the probe is positioned within this probe cover at least partly below the flange. In this manner, the probe is positioned beneath the surface of the tank when the level sensing gauge is attached to the tank, thereby reducing the disruption of the aforementioned properties by the tank. Finally, the level sensing gauge may include a rod-shaped waveguide, which attaches to the base of the probe cover and protrudes into the storage tank. This waveguide is used to direct electrical and mechanical properties between the probe and the surface of contents within the tank.

More specifically, the probe of the level sensing gauge may be an antenna for transmitting and receiving microwave radar waves, with the probe cover thus being an antenna cover. This antenna extends forward from the base of the housing and is surrounded by the antenna cover. The antenna cover forms a sheath about the longitudinal axis of the antenna. One end of the cover is proximate to the base of the housing and the other end is attached the waveguide. Within the interior of the antenna cover is a first cylindrical bore for housing the antenna. At the end of this cylindrical bore nearest to the housing is a threaded, hollow extension which surrounds the cylindrical bore. This threaded extension is received by threads which are located along the inner wall of a second cylindrical bore located in the base of the housing. By twisting the threaded extension of the antenna cover into the cylindrical bore of the housing, the antenna cover is attached to the housing of the level sensing gauge.

The section of the antenna cover that contacts the housing of the level sensing gauge includes the sealing flange which is annular. This flange contains a ridge which is unitary with and circumferential about the flange. This ridge corresponds to a groove located in a collar on the surface of the tank. This collar surrounds an orifice in the tank through which the level sensing gauge is to be inserted. The ridge and groove cooperate to form a sanitary seal, thereby reducing the potential of contamination by microorganisms and other foreign substances. Any such prevention of contamination of tank contents saves both time and money due to the loss of production resulting from contamination. The cooperation of the ridge and groove is facilitated by the use of a clamp which holds the flange of the antenna cover against the collar of the tank. This clamp encircles the collar and the annular flange of the antenna cover.

The configuration of the level sensing gauge as clamped to the collar of the tank results in increased technical performance of the level sensing gauge. As previously mentioned, the antenna of the level sensing gauge is housed within an antenna cover having a lower end attached to a rod waveguide and an upper end having an annular flange and a compression ridge radial seal that cooperates with a collar located on the body of the tank. In the level sensing gauge structure as described, the antenna is positioned at least partly below the annular flange of the antenna cover. As the flange is positioned at least flush with and at most slightly above the surface of the tank, the remainder of the antenna cover is thereby positioned underneath the surface of the tank. The enclosed antenna is therefore less susceptible to interference due to the surrounding tank. This results in enhanced performance of the level sensing gauge.

In accordance with the principles of the present invention, the structure of the level sensing gauge having an antenna cover as described positions the antenna beneath the surface of the storage tank during its attachment. This location allows the microwave radar pulses to flow to and from the antenna with minimal interference from the body of the tank. Additionally, the compression ridge radial seal of the flange in cooperation with the groove of a collar welded to the surface of the tank provides a sanitary seal for the prevention of contamination of the contents of the tank.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE DRAWING

Figure 1:
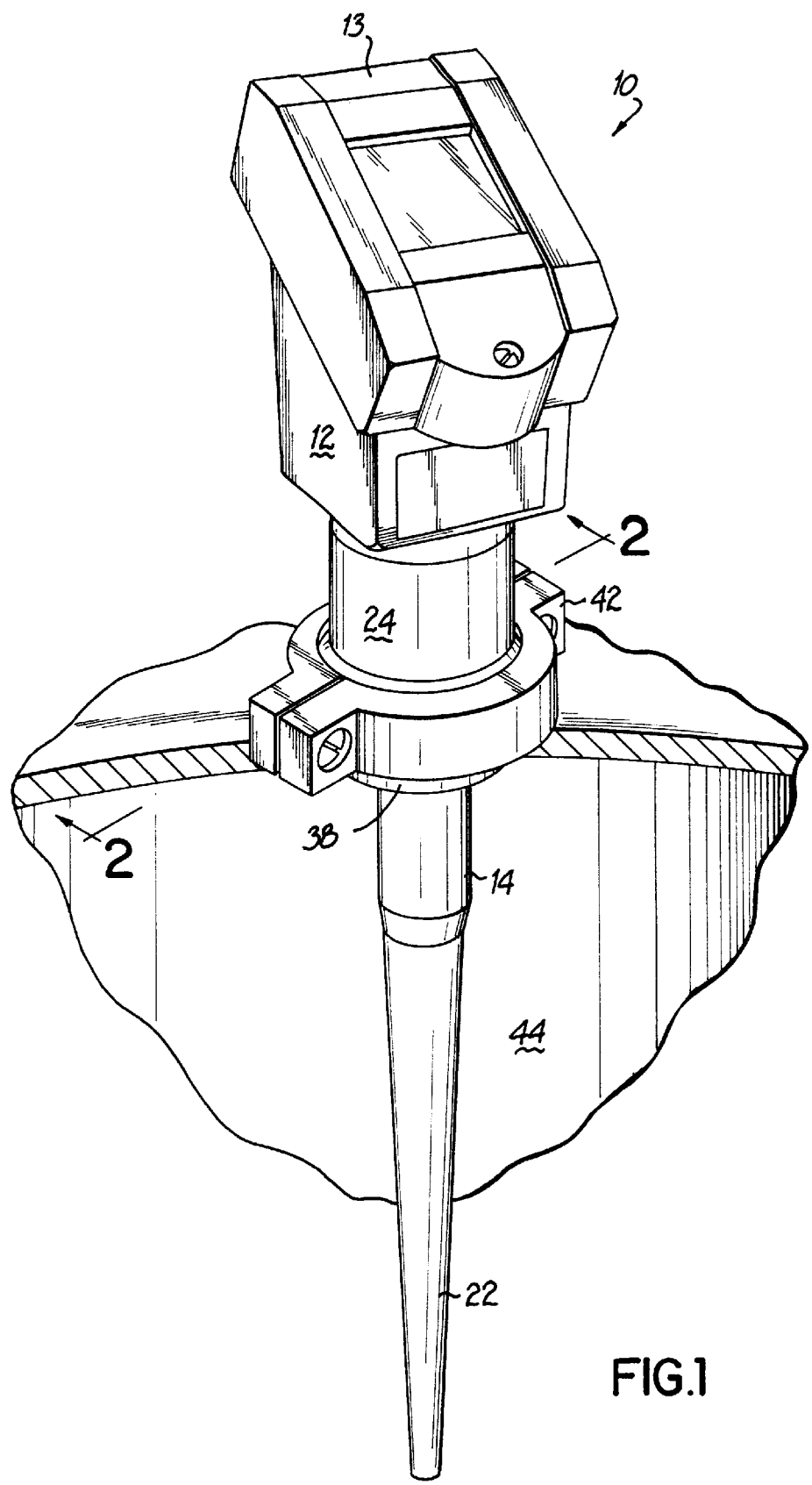
FIG. 1 is a perspective view of the level sensing gauge of the present invention mounted to a cross-sectioned storage tank.
Figure 2:
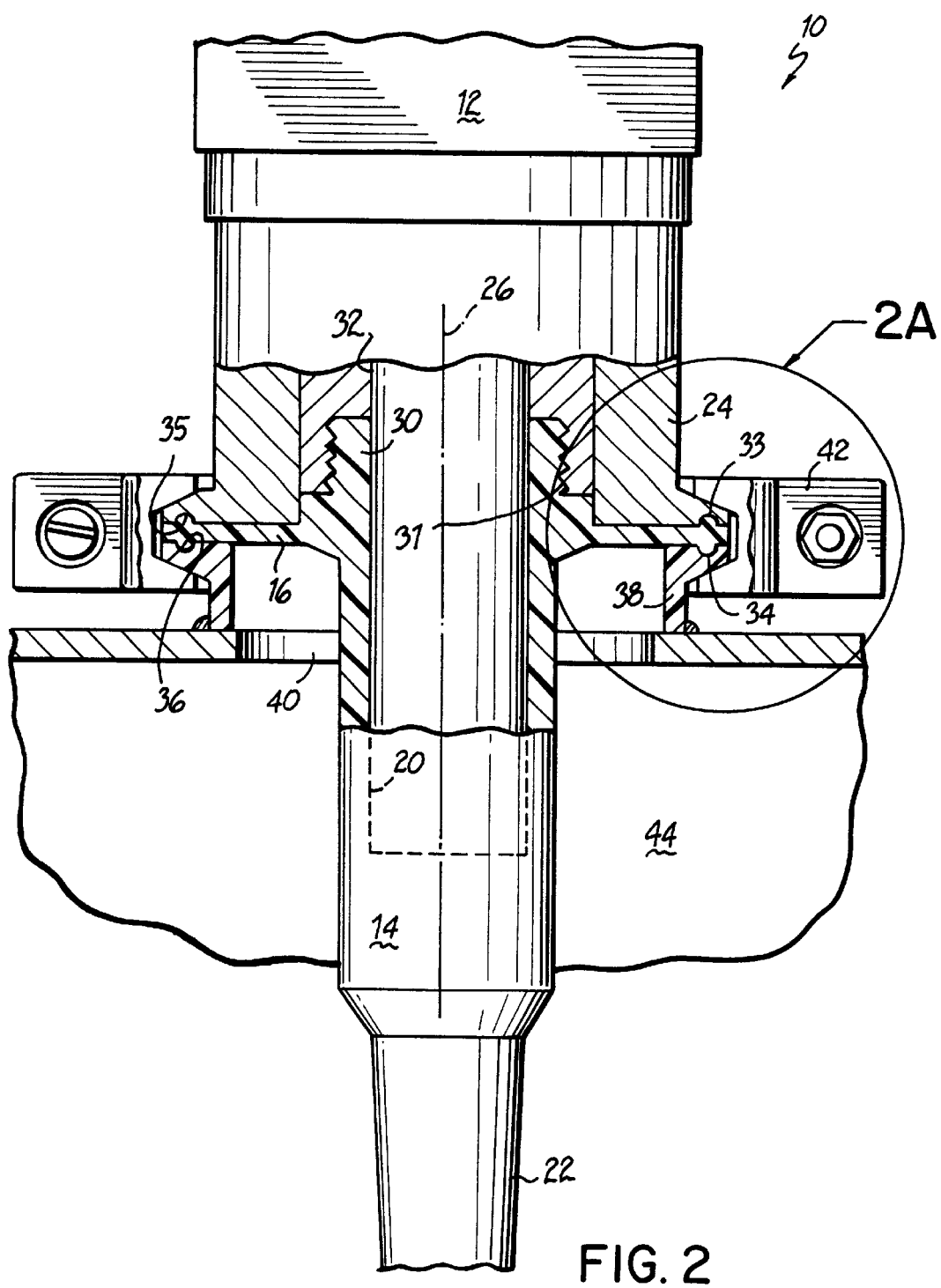
FIG. 2 is a partial cross-sectional view of the level sensing gauge of the present invention taken along lines 2—2 of FIG. 1.

Referring to FIGS. 1 and 2, the pulse radar level sensing gauge 10 of the present invention includes an enclosed housing 12, which forms a chamber for containing a transmitter and antenna 20 of the level sensing gauge. The housing 12 is preferably made of plastic and includes a hinged removable lid 13 for access to the components of the transmitter. An antenna cover 14 extends from the base 24 of the housing 12 to sheath the antenna 20, which protrudes from the base of the housing. The antenna cover 14 is in the form of a single piece and further comprises an annular sealing flange 16 and first and second compression ridge radial seals 33, 34. The shape of the flange and inclusion of the compression ridges 33, 34 aids in forming a sanitary seal between the level sensing gauge 10 and tank 44, which has great importance in several applications, particularly those involving tanks housing foods or pharmaceuticals. The antenna 20 is housed within the antenna cover 14 and transmits and receives microwave radar to and from the surface of the contents of a storage or processing tank 44. The location of the antenna 20 within the antenna cover 14 and at least partly below the flange 16 aids in the reduction of disruption of the microwave radar pulses when the level sensing gauge 10 is attached to the body of a tank 44.

In the specific disclosed embodiment, the level sensing gauge 10 includes a rod-shaped waveguide 22, which attaches to the base of the antenna cover 14. Both the antenna cover 14 and the waveguide 22 are preferably made of Teflon® (PTFE). The waveguide 22 is used to direct the microwave radar pulses between the antenna 20 and the surface of the contents within the tank 44. Although in the specific disclosed embodiment these waves are microwave pulse radar waves, they may be continuous waves, ultrasonic waves, or of some other alternate form.

More specifically, the antenna 20 of the level sensing gauge 10 extends forwardly from the base 24 of the housing 12 and is surrounded by the antenna cover 14. This antenna cover 14 forms a sheath about the longitudinal axis 26 of the antenna 20. The end of the antenna cover 14 comprising the annular flange 16 and first and second compression ridge radial seals 33, 34 is located proximate to the base 24 of the housing 12 following completed assembly of the level sensing gauge 10. The waveguide 22 is attached to the end of the antenna cover 14 distal from the housing 12 of the level sensing gauge 10. In alternate embodiments of the level sensing gauge 10 of the present invention, the threaded extension 30 may be twisted into and received by the base 24 of the housing 12 itself, as opposed to a second cylindrical bore 32.

Within the interior of the antenna cover 14 is a first cylindrical bore 28 for housing the antenna 20. The dimensions of this first cylindrical bore 28 are such that the antenna 20 fits snugly inside. The first cylindrical bore 28 is closed at the end proximate to the point of attachment of the waveguide 22, and includes an orifice at its end most proximate the base 24 of the housing 12 of the level sensing gauge 10. This orifice receives the antenna 20 during assembly of the level sensing gauge 10. Located at the end of this first cylindrical bore 28 most proximate to the base 24 of the housing 12 of the level sensing gauge 10 is a threaded hollow extension 30, which is unitary with the antenna cover 14 and circumferential about the orifice of the first cylindrical bore.

Within the interior of the base 24 of the housing 12 is a second cylindrical bore 32. This second cylindrical bore 32 contains the antenna 20 within the housing 12 from which it forwardly extends to the antenna cover 14. The inner wall of this second cylindrical bore 32 is comprised of threads 31 which receive the threaded extension 30 of the antenna cover 14. By twisting the threaded extension 30 of the antenna cover 14 into the threads 31 of the second cylindrical bore 32, the antenna cover 14 is attached to the housing 12 of the level sensing gauge 10.

In securing the antenna cover 14 to the housing 12 of the level sensing gauge 10, the attachment is aided by the cooperation of a ridge and groove sealing arrangement. The surface of the sealing flange 16 of the antenna cover 14 nearest the base 24 of the housing 12 further comprises a first compression ridge radial seal 33. This ridge 33 is monolithic with and circumferential about the surface of the annular flange 16 which contacts the base 24 of the housing 12. This first compression ridge radial seal 33 reduces the permeability of the seal formed between the antenna cover 14 and the housing 12 of the level sensing gauge 10. As the threaded extension 30 of the antenna cover 14 is twisted into the threads 31 of the second cylindrical bore 32 of the housing 12, the first compression ridge radial seal 33 of the upper surface of the annular sealing flange 16 is aligned and cooperates with a groove 35 depressed into the lower surface of the base 24 of the housing 12. The cooperation of this ridge and groove forms a seal between the housing 12 and the antenna cover 14 of the level sensing gauge 10.

Following attachment of the antenna cover 14 to the base of the housing 12, the antenna 20 housed inside the antenna cover is positioned to extend beneath the plane of the annular flange 16 that is perpendicular to a plane along the longitudinal axis 26 of the antenna 20. This positioning of the antenna 20 reduces the interference with the microwave radar pulses caused by the body of a storage tank 44. This location improves the present invention over level sensing gauges found in the prior art.

Figure 3:
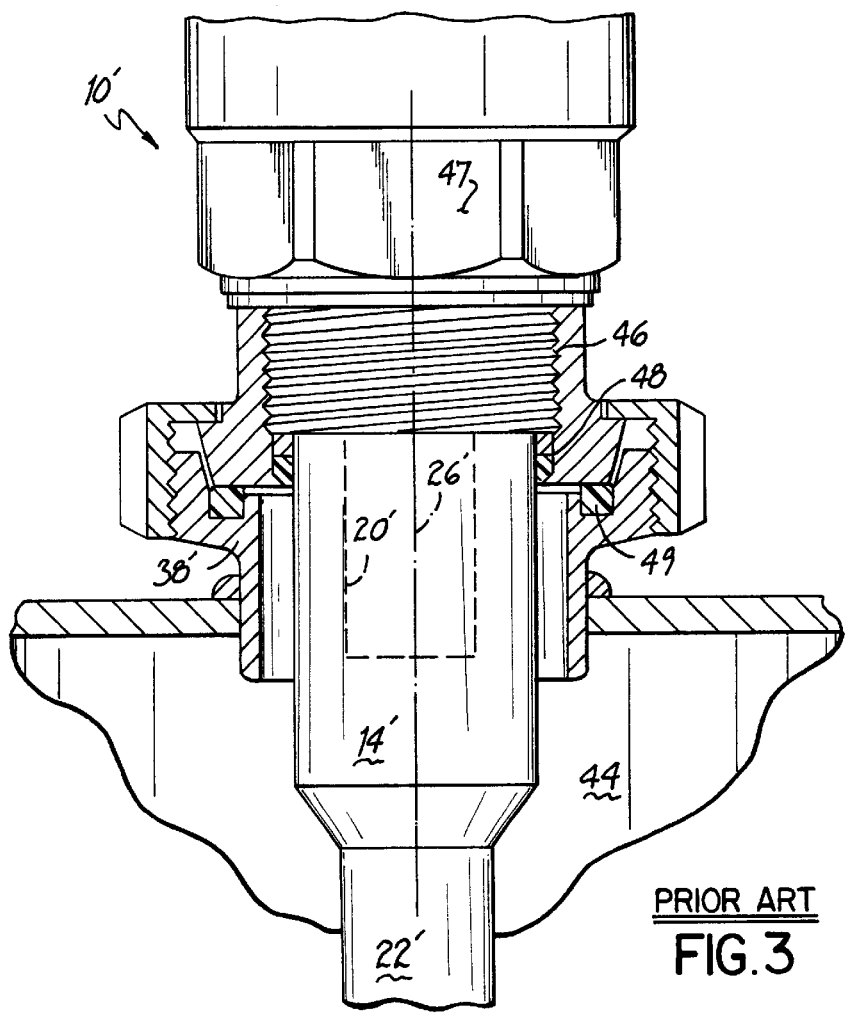
FIG. 3 is a partial cross-sectional view of a level sensing gauge of the prior art similar to FIG. 2.
Figure 4:
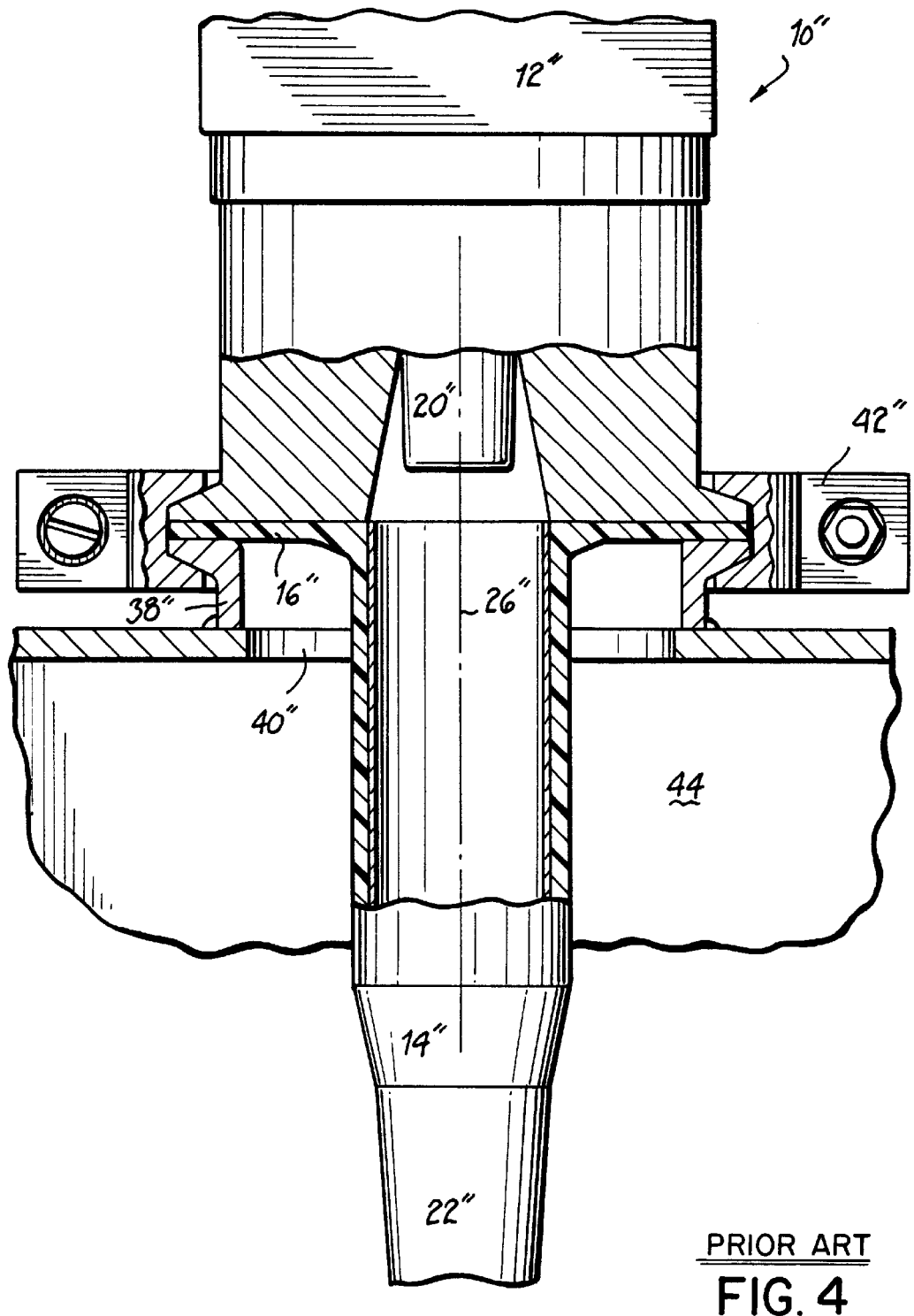
FIG. 4 is a partial cross-sectional view of a level sensing gauge of yet another prior art similar to FIG. 2.

FIGS. 3 and 4 depict level sensing gauges of the prior art. In FIG. 3 the antenna 20' of the level sensing gauge 10' extends forwardly from a mounting fitting 47 which includes a threaded extension 46. This threaded extension 46 is then twisted (about axis 26') into and received by threads located in the antenna cover 14' of the level sensing gauge 10'. The seal between the threaded extension 46 of the mounting fitting 47 and the antenna cover 14' of the level sensing gauge 10' is completed by the use of a sanitary gasket 48. The level sensing gauge 10' is then mounted into a collar 38' located on the surface of the tank 44. The seal between the antenna cover 14' of the level sensing gauge 10' and the collar 38' of the tank 44 is also facilitated by a sanitary gasket 49. As is shown in FIG. 3, this configuration of a level sensing gauge 10' suffers from both of the problems discussed above. First, the mounting fitting 47, antenna cover 14', and collar 38' assembly consists of multiple components, each of which is sealed by gaskets 48. Not only is this gasket seal not as sanitary or as cleanable as the use of the compression ridge radial seal and groove of the present invention, but as can be seen from FIG. 3, the antenna 20' in this configuration does not extend appreciably beneath the surface of the tank 44.

The level sensing gauge 10" of FIG. 4 reduces potential contamination caused by the use of multiple components and gaskets. As depicted, this level sensing gauge utilizes a unitary flange seal 16" about axis 26" and a clamp 42" during attachment of the housing 12" of level sensing gauge 10" a collar 38" in orifice 40" to a storage tank 44. However, as the antenna 20" of this level sensing gauge 10" is positioned entirely above the antenna cover 14", it does not extend beneath the surface of a tank 44 to which it is attached. Therefore, this configuration of a level sensing gauge 10" will encounter problems of interference of the microwave radar pulses due to the surface of the tank 44.

Referring now to FIG. 2, the present invention seeks to eliminate both the discussed problems of the prior art through its novel configuration of a one-piece sealing flange 16 sheathing an antenna 20. To use the level sensing gauge 10, it first must be attached to a storage tank 44. During this attachment, the flange 16 of the antenna cover 14 contacts and cooperates with a collar 38 located on the body of the tank 44. This flange 16 is annular about the entire circumference of the antenna cover 14 and includes a second compression ridge radial seal 34 which is monolithic with and circumferential about the flange. This second compression ridge radial seal 34 is located on the surface of the flange 16 distal from the base 24 of the housing 12 of the level sensing gauge 10. The compression ridge radial seal 34, corresponds to a groove 36 located circumferentially about an edge on a collar 38 on the surface of the tank 44. This collar 38 is generally a metal ring or band located about an orifice 40 which is cut in the body of the tank 44. The end of this collar 38 distal from the surface of the body of the tank 44 includes an edge into which is depressed the groove 36 to cooperate with the second compression ridge radial seal 34. The level sensing gauge 10 is inserted into the tank 44 through this collar 38 and orifice 40. The compression ridge radial seal 34 located on the surface of the annular flange 16 distal from the housing 12 of the level sensing gauge 10 cooperates with the groove 36 located about the edge of the collar 38 to form a sanitary seal, thereby reducing the potential of contamination of the tank contents by microorganisms and other substances foreign to those contents. This reduction in the potential for contamination saves both time and money due to the loss of production which results from contamination.

Figure 2A:
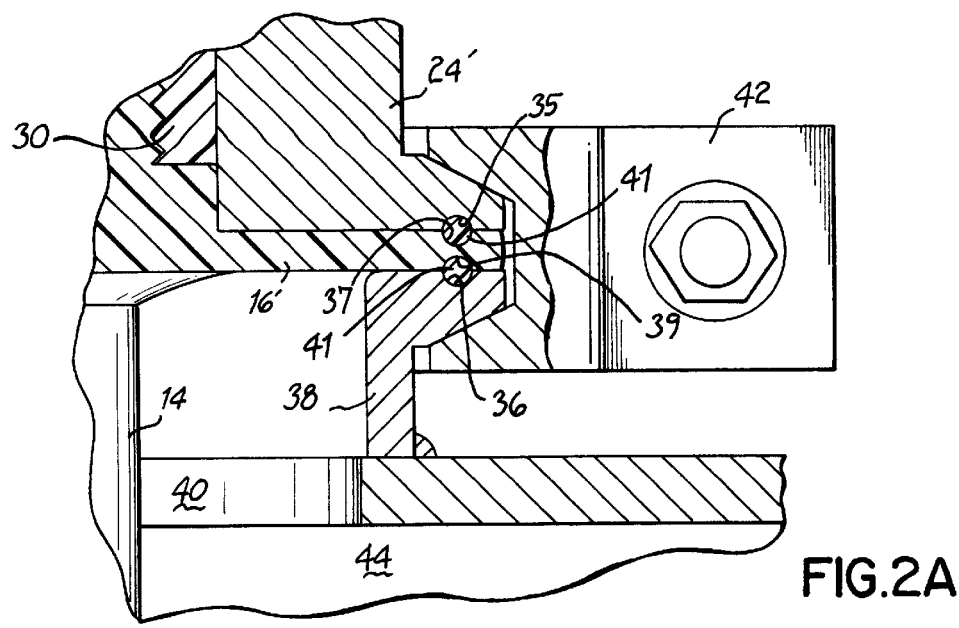
FIG. 2A is a partial cross-sectional view of an alternate embodiment of the level sensing gauge of the present invention.

FIG. 2A demonstrates an alternate embodiment of the sealing attachment of flange 16' to the base 24' of the housing 12 and to the collar 38 of the tank 44. In this embodiment, the flange 16' comprises first and second grooves, 37, 39. These grooves are depressions into the upper and lower surfaces of the flange 16', respectively, and are circumferential about its surface. The first groove 37 located on the surface of the flange 16' proximate to the base 24' of the housing corresponds to the groove 35 located in the base 24' of the housing 12. Likewise, the second groove 39 located on the surface of the flange 16' proximate to the collar 38 corresponds to the groove 36 located on the edge of the collar 38. During assembly of the level sensing gauge 10, an O-ring 41 cooperates with the first groove 37 on the surface of the flange 16' proximate to the base 24' of the housing. As the threaded extension 30 of the antenna cover 14 is twisted into the threads of the base 24' of the housing 12, the O-ring 41 corresponds with the groove 35 depressed into the lower surface of the base 24' of the housing 12. The cooperation of the O-ring with the grooves 35, 37 of the flange 16' and the base 24' of the housing forms a seal between the flange of the antenna cover 14 and the base of the housing. A second O-ring 41 corresponds with the groove 36 depressed into an edge of the collar 38. During attachment of the level sensing gauge 10 to the tank 44, this O-ring 41 cooperates with the groove 39 located on the surface of the flange 16' proximate to the collar 38. This O-ring 41 form a sanitary seal between the flange 16' of the antenna cover 14 and the collar 38 attached to the surface of the tank 44.

Referring back to FIG. 2, the cooperation of the compression ridge radial seal 34 and groove 36 is facilitated by the use of a clamp 42 which holds the flange of the antenna cover 14 against the collar of the tank. This clamp 42 is may be a Tri-Clamp®, which is commercially available from Tri-Clover, Inc., Kenosha, Wis., or any other commercially available suitable clamp.

The configuration of the level sensing gauge 10 and tank 44 that results from cooperation of the groove 36, second compression ridge radial seal 34 and clamp 42 prevents the contamination of tank contents, but reduces interference with radar pulses as well. As previously discussed, the antenna 20 is positioned within the housing 12 beneath the annular flange 16 of the antenna cover 14. As the flange 16, which comprises the upper end of the antenna cover 14, may be positioned at least flush with and at most slightly above the body of the tank 44, a good portion of the antenna cover 14 is necessarily positioned below the surface of the tank. Likewise, the antenna 20 contained within that antenna cover 14 is also at least partly positioned within the body of the tank 44 and is able to operate with a reduced level of interference from the surrounding body of the tank. The result is enhanced technical performance of the level sensing gauge 10.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A level sensing gauge for insertion into a tank with improved performance in measuring levels of contents in said tank, said level sensing gauge comprising:
    a housing;
    a probe cover for sheathing a probe, said probe cover comprising a sealing flange including a seal on a surface of said flange distal to said housing for preventing contamination of said tank contents by substances foreign to said tank contents; and
    a probe for sensing electrical or mechanical properties, positioned within said probe cover and sensing electrical or mechanical properties through said probe cover, said probe positioned at least partly below said sealing flange of said probe cover, thereby improving the accuracy of measured levels of contents in said tank by reducing disruption of said properties by said tank following attachment of said level sensing gauge to said tank.

2. The gauge of claim 1 wherein said probe is an antenna and said properties are microwave radar waves.

3. The gauge of claim 2 wherein said waves are continuous.

4. The gauge of claim 1 wherein said probe is a transducer and said properties are ultrasonic waves.

5. The gauge of claim 1 wherein said probe cover further comprises a rod waveguide for directing waves between said probe and said tank contents.

6. The gauge of claim 5 wherein said probe transmits waves to said waveguide for direction into said tank.

7. The gauge of claim 5 wherein said probe receives reflected waves from said waveguide.

8. The gauge of claim 1 further comprising a mounting, said mounting positioned and configured such that said probe is positioned inside said tank following attachment of said level sensing gauge to said tank.

9. The gauge of claim 1 wherein said probe extends from a base of said housing.

10. The gauge of claim 9 wherein said probe cover is located about the longitudinal axis of said probe with a first end proximate to the base of said housing of said level sensing gauge and a second end distal from said housing.

11. The gauge of claim 10 wherein said probe cover extends from said housing, and said probe cover has a first cylindrical bore therein for sheathing said probe.

12. The gauge of claim 11 wherein said probe cover further comprises a threaded, hollow extension circumferential about an end of said first cylindrical bore proximate to said housing of said level sensing gauge.

13. The gauge of claim 12 further comprising a compression ridge radial seal monolithic with and circumferential about said flange proximate to the base of said housing.

14. The gauge of claim 13 further comprising a groove circumferential about the base of said housing proximate to said flange and corresponding to said compression ridge radial seal.

15. The gauge of claim 14 wherein said threaded cylindrical extension is received by threads on the inner wall of a second cylindrical bore located in the base of said housing for attaching said probe cover to said housing.

16. The gauge of claim 1 wherein said flange further comprises a groove circumferential about the surface of said flange proximate to said housing.

17. The gauge of claim 16 further comprising a groove circumferential about a base of said housing proximate to said flange and corresponding to said groove on said flange.

18. The gauge of claim 17 further comprising a gasket interposed between said groove of said base of said housing and said groove of said flange.

19. The gauge of claim 1 further comprising a groove circumferential about the surface of said flange distal to said housing, and further comprising a mounting, said mounting positioned and configured such that said probe is positioned inside said tank following attachment of said level sensing gauge to said tank.

20. The gauge of claim 19 wherein said mounting further comprises a collar attached to the body of said tank.

21. The gauge of claim 20 wherein said collar further comprises a groove circumferential about an edge of said collar proximate to the surface of said flange distal to said base of said housing.

22. The gauge of claim 21 wherein said groove of said collar corresponds to said groove of said flange.

23. The gauge of claim 22 further comprising a gasket interposed between said groove of said collar and said groove of said flange.

24. The gauge of claim 1 wherein said flange is annular.

25. The gauge of claim 24 wherein said annular flange further comprises a compression ridge radial seal on a surface of said annular flange distal to said housing of said level sensing gauge.

26. The gauge of claim 25 wherein said compression ridge radial seal is monolithic with and circumferential about said annular flange.

27. The gauge of claim 26 wherein said compression ridge radial seal corresponds to a groove located on a collar attached to the surface of said tank.

28. A storage tank and level sensing gauge system comprising:
a storage tank;
an orifice in said tank for receiving a level sensing gauge;
a collar attached to said tank and circumferential about said orifice; and
a level sensing gauge for insertion into said tank for measuring a level of contents inside said tank, said level sensing gauge comprising a housing, a probe cover for sheathing a probe, said probe cover comprising a sealing flange for preventing contamination of said tank contents by foreign substances, and a probe for sensing electrical or mechanical properties, positioned within said probe cover and sensing electrical or mechanical properties through said probe cover, said probe positioned at least partly below said sealing flange of said probe cover,
wherein said probe cover is sealed to said collar on a surface of said flange distal to said housing of said level sensing gauge.

29. The system of claim 28 wherein said flange is annular.

30. The system of claim 29 wherein said annular flange further comprises a compression ridge radial seal on surface of said flange distal to said housing of said level sensing gauge.

31. The system of claim 30 wherein said compression ridge radial seal is monolithic with and circumferential about said annular flange.

32. The system of claim 31 wherein said compression ridge radial seal corresponds to a groove located on said collar.

33. The system of claim 32 wherein said groove is circumferential around an edge of said collar distal from said tank.

34. The system of claim 33 further comprising a clamp for clamping said compression ridge radial seal against said groove, thereby attaching said probe cover to said collar.

35. The system of claim 34 wherein said clamp encircles outer circumference of said collar and said annular flange of said probe cover.

36. The system of claim 35 wherein said probe is positioned inside said tank.

37. A method of securing a level sensing gauge having a housing, a probe cover for sheathing a probe wherein said probe cover has an annular sealing flange, and a probe for sensing electrical or mechanical properties wherein said probe is positioned within said probe cover and sensing electrical or mechanical properties through said probe cover, said probe positioned at least partly below said sealing flange, to a storage tank having an orifice in said tank and a cylindrical collar circumferential about said orifice, said method comprising the steps of:
inserting said level sensing gauge into said orifice;
extending said level sensing gauge into said orifice so that said probe is located below the surface of said tank; and
mounting and sealing said sealing flange of said level sensing gauge to said collar.

38. The method of claim 37 wherein said annular flange further comprises a compression ridge radial seal monolithic with and circumferential about the surface of said annular flange distal to said housing of said level sensing gauge wherein said method further comprises the step of aligning said compression ridge radial seal with said collar during mounting of said level sensing gauge to said tank.

39. The method of claim 38 wherein said collar further comprises a groove circumferential about an edge of said collar and wherein said method further comprises the step of aligning said groove with said level sensing gauge for mounting said level sensing gauge to said tank.

40. The method of claim 39 further comprising the step of aligning said compression ridge radial seal with said groove.

41. The method of claim 40 further comprising the step of clamping said annular flange against said collar with at least one clamp, whereby said level sensing gauge is sanitarily sealed to said tank to prevent the ingress of substances foreign to said contents of said tank.

42. A method for securing a level sensing gauge to a storage tank comprising the steps of:
providing a level sensing gauge having a housing, a probe cover for sheathing a probe wherein said probe cover has an annular flange, and a probe for sensing electrical or mechanical properties wherein said probe is positioned within said probe cover and sensing electrical or mechanical properties through said probe cover, said probe positioned below said flange;
providing a storage tank having an orifice in the tank and a cylindrical collar circumferential about said orifice;
inserting said level sensing gauge into said orifice;
extending said level sensing gauge into said orifice so that said probe is located below the surface of said tank; and
mounting and sealing said sealing flange of said level sensing gauge to said collar.

43. The method of claim 42 wherein said level sensing gauge is further provided with a compression ridge radial seal monolithic with and circumferential about the surface of said annular flange distal to said housing of said level sensing gauge.

44. The method of claim 43 wherein said collar is further provided with a groove circumferential about an edge of said collar.

45. The method of claim 44 further comprising the step of aligning said compression ridge radial seal with said groove.

46. The method of claim 45 further comprising the step of clamping said annular flange against said collar with at least one clamp, whereby said level sensing gauge is sanitarily sealed to said tank to prevent the ingress of substances foreign to said contents of said tank.

* * * * *